United States Patent [19]

Robinson

[11] Patent Number: 4,595,158
[45] Date of Patent: Jun. 17, 1986

[54] AIRCRAFT CONTROL SURFACE ACTUATION AND COUNTERBALANCING

[75] Inventor: Curtiss W. Robinson, Seattle, Wash.

[73] Assignee: The Boeing Company, Wichita, Kans.

[21] Appl. No.: 536,040

[22] Filed: Sep. 26, 1983

[51] Int. Cl.[4] ................. B64C 13/36; B64C 13/46
[52] U.S. Cl. ................................ 244/75 R; 244/78; 244/223
[58] Field of Search ............... 244/75 R, 76 R, 76 B, 244/76 C, 78, 221, 223, 226, 227, 230, 90 B; 60/388, 411, 403, 400, 415

[56] References Cited

U.S. PATENT DOCUMENTS

| | | | |
|---|---|---|---|
| 1,291,664 | 1/1919 | Von Schrenk . | |
| 1,584,931 | 5/1926 | Handy et al. . | |
| 1,928,961 | 10/1933 | Brown | 97/50 |
| 1,986,428 | 1/1935 | Dodge | 74/518 |
| 2,205,610 | 6/1940 | Van Nes | 244/83 |
| 2,328,204 | 8/1943 | Ferris | 20/19 |
| 2,549,140 | 4/1951 | Svendsen | 16/1 |
| 2,611,282 | 9/1952 | Bright | 74/518 |
| 2,620,772 | 12/1952 | McLane | 244/226 |
| 2,669,401 | 2/1954 | Bosserman | 244/82 |
| 2,720,368 | 10/1955 | Payne, Jr. | 244/90 B |
| 2,721,446 | 10/1955 | Bumb | 60/415 |
| 2,796,774 | 6/1957 | Peed, Jr. | 74/522 |
| 2,817,483 | 12/1957 | Hill | 244/76 R |
| 2,916,205 | 12/1959 | Litz | 235/61 |
| 2,974,908 | 3/1961 | Plaff | 244/230 |
| 3,205,728 | 9/1965 | Morris et al. | 74/516 |
| 3,303,714 | 2/1967 | Fontaine | 74/470 |
| 3,369,779 | 2/1968 | Frederiksen et al. | 244/226 |
| 3,625,005 | 12/1971 | Saunders et al. | 60/54.6 |
| 3,633,366 | 1/1972 | Cripe | 60/54.6 |
| 3,693,474 | 9/1972 | Trick | 74/522 |
| 3,707,075 | 12/1972 | Cripe | 60/54.6 |
| 3,897,695 | 8/1975 | Rostad | 74/516 |
| 4,005,617 | 2/1977 | Sourbel et al. | 74/516 |

FOREIGN PATENT DOCUMENTS

| | | | |
|---|---|---|---|
| 543144 | 7/1957 | Canada . | |
| 694977 | 8/1940 | Fed. Rep. of Germany . | |
| 689704 | 2/1930 | France . | |
| 566851 | 1/1945 | United Kingdom | 244/226 |
| 1069703 | 5/1967 | United Kingdom . | |

Primary Examiner—Galen L. Barefoot
Attorney, Agent, or Firm—Delbert J. Barnard

[57] ABSTRACT

A flight control surface (1) is supported from an aircraft frame structure (12), for pivotal movement about a hinge axis. The surface (10) is deployed against an aerodynamic load which is a function of surface deflection and imposes a torque on the flight control surface (10) wanting to rotate it back to a neutral trim position. A counterbalancing hydraulic actuator (16, 16', 226, 334, 372, 402) is connected between the frame structure (12) and the flight control surface (10). This actuator (16, 16', 226, 334, 372, 402) is oriented to oppose a counterbalancing torque on the flight control surface (10) acting in opposition to the torque imposed by the aerodynamic load. A controllable, separate actuator (34, 312, 422) is interconnected between the frame structure (12) and the flight control surface (10) and is operated for positioning the flight control surface (10).

18 Claims, 21 Drawing Figures

BUNGEE WITH BOTH TRIM AND GRADENT ADJUSTMENTS

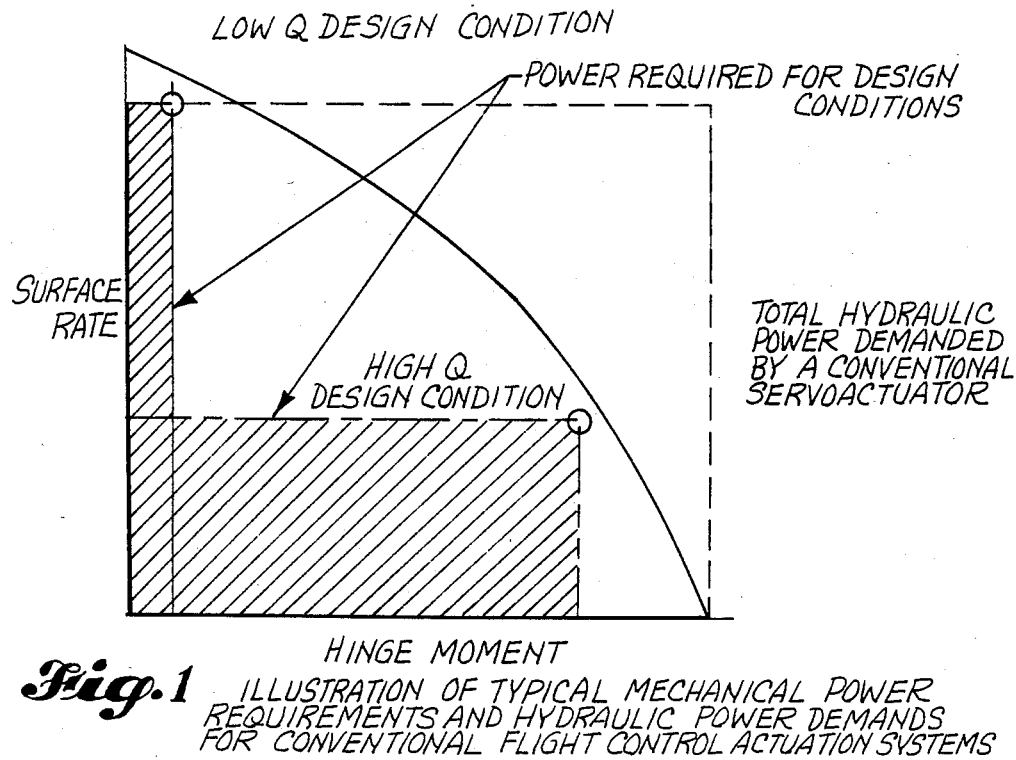
Fig. 1 ILLUSTRATION OF TYPICAL MECHANICAL POWER REQUIREMENTS AND HYDRAULIC POWER DEMANDS FOR CONVENTIONAL FLIGHT CONTROL ACTUATION SYSTEMS
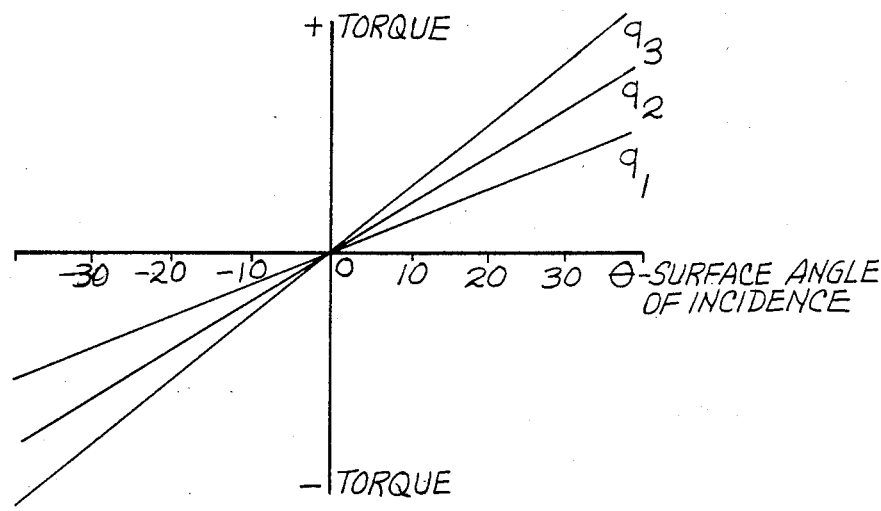
Fig. 2 AERODYNAMIC LOAD TORQUE AS A FUNCTION OF SURFACE DEFLECTION AND DYNAMIC PRESSURE

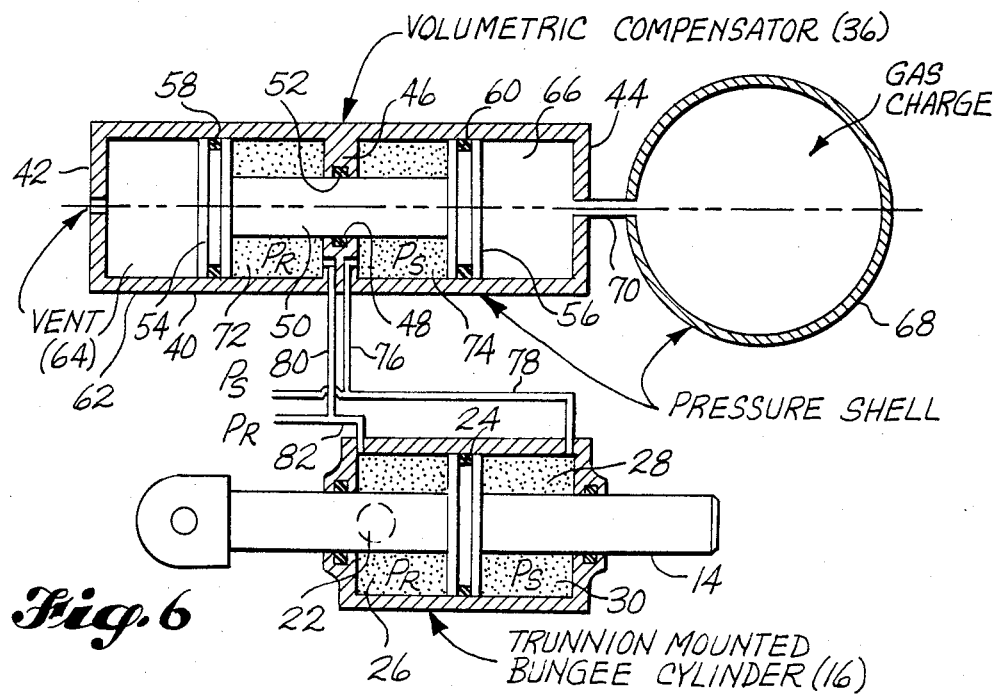
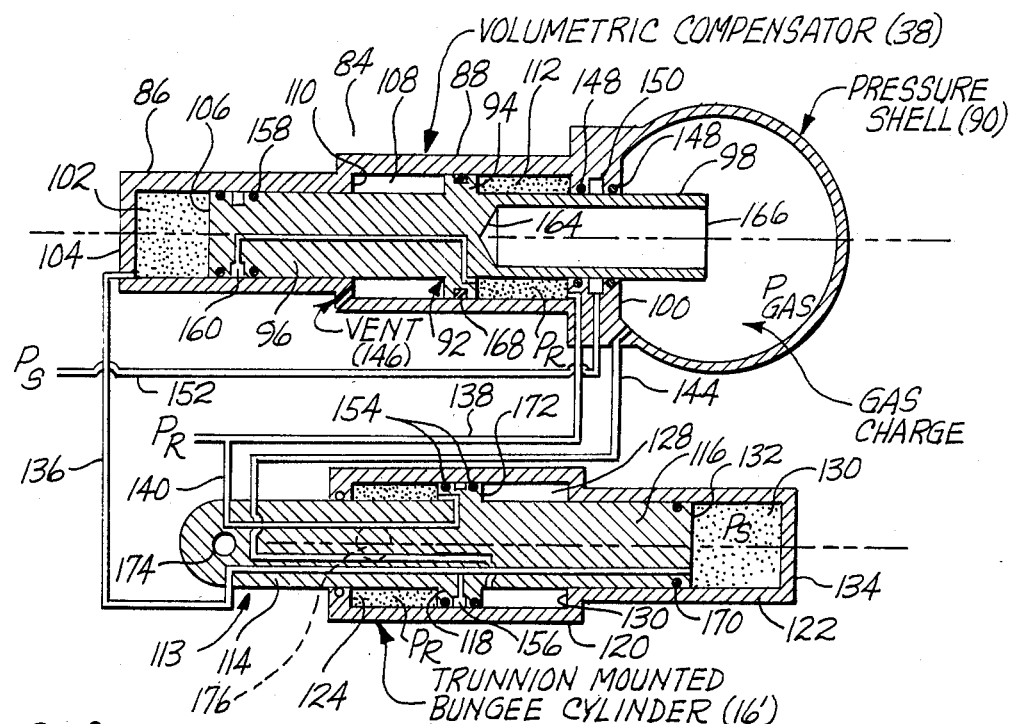

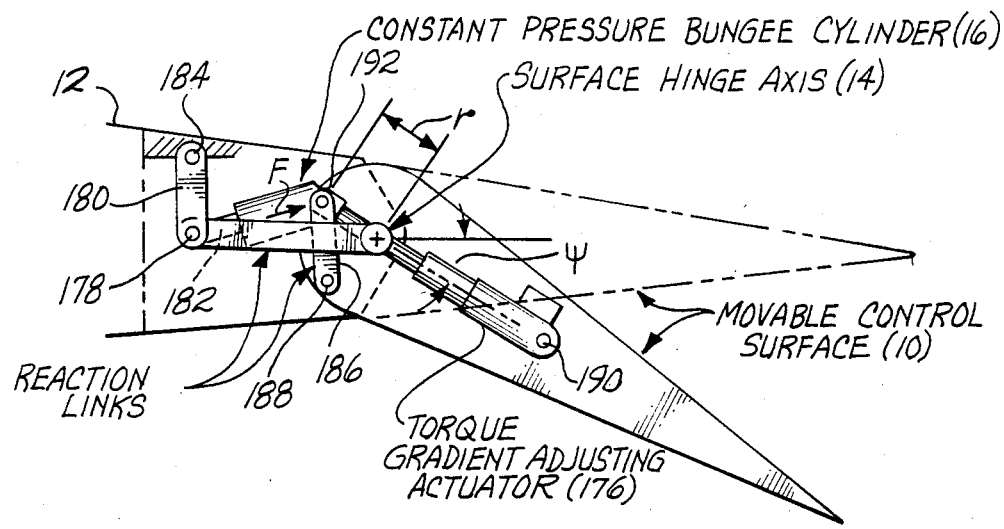
Fig. 8 BASIC AERO-SPRING COUNTERBALANCE BUNGEE SCHEME
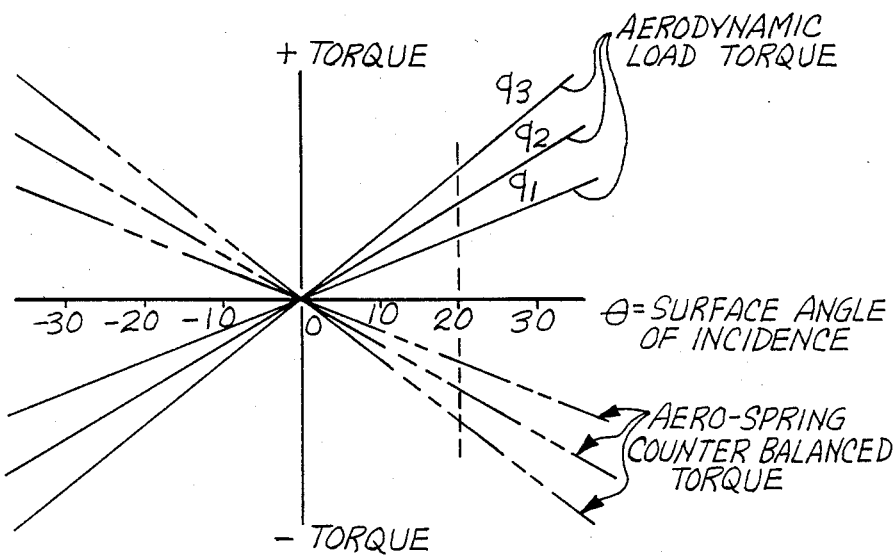
Fig. 9 TORQUE VS SURFACE DEFLECTION FOR A BASIC AERO-SPRING COUNTERBALANCE SYSTEM

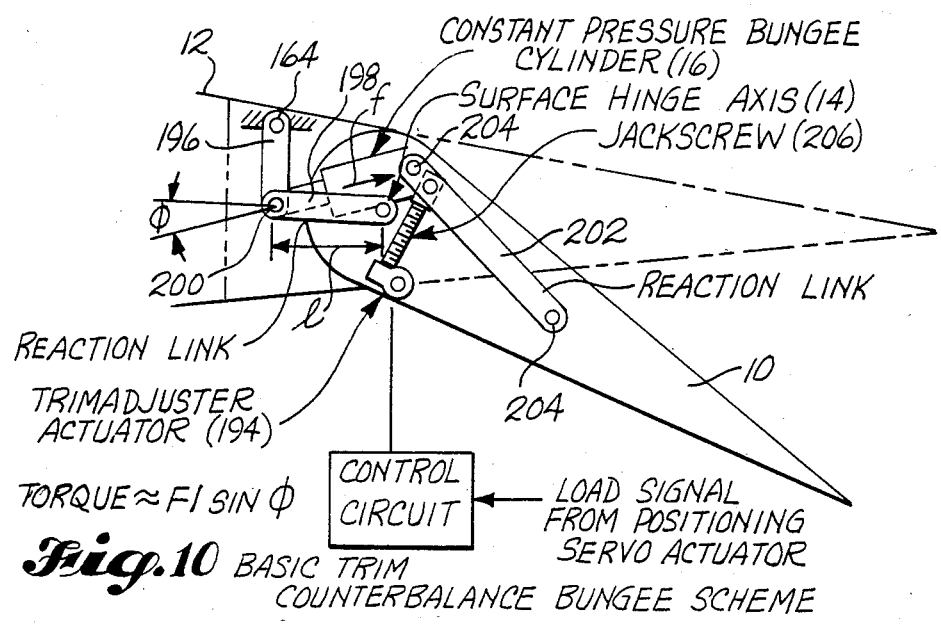
Fig. 10 BASIC TRIM COUNTERBALANCE BUNGEE SCHEME
TORQUE ≈ $Fl \sin \phi$
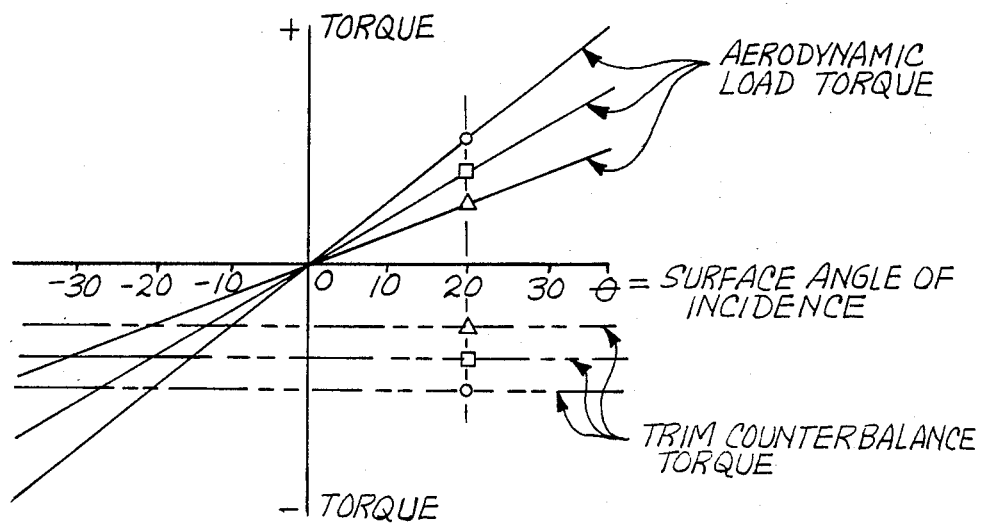
Fig. 11 TORQUE VS SURFACE DEFLECTION FOR A BASIC TRIM COUNTERBALANCE SYSTEM

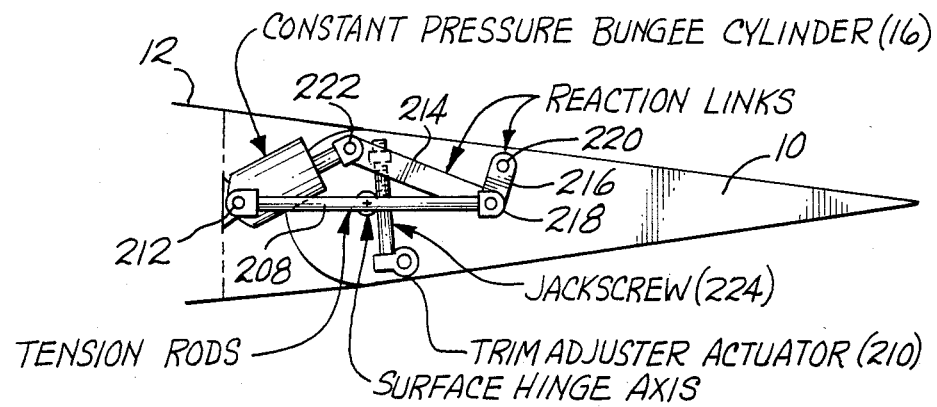
Fig. 12
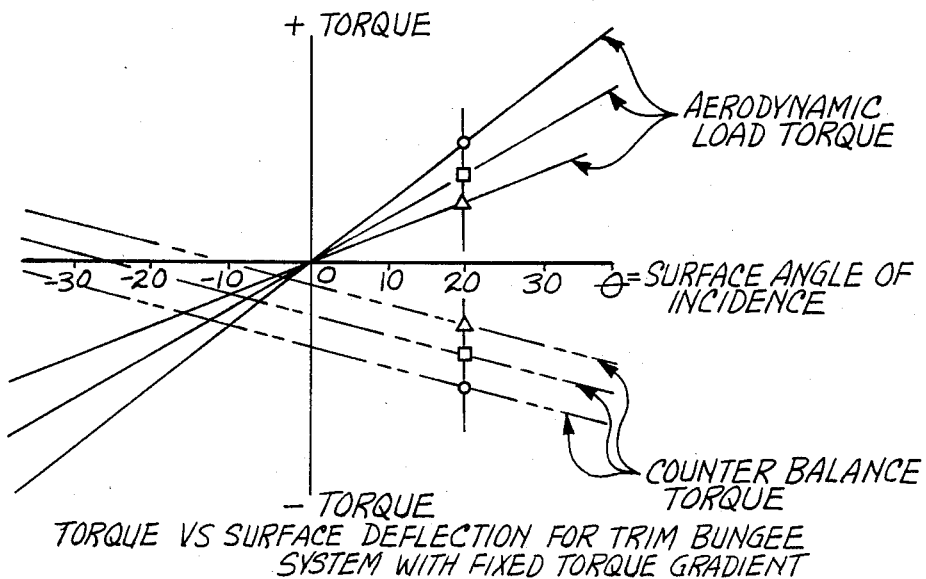
Fig. 13 TRIM COUNTERBALANCE BUNGEE SYSTEM WITH FIXED TORQUE GRADIENT

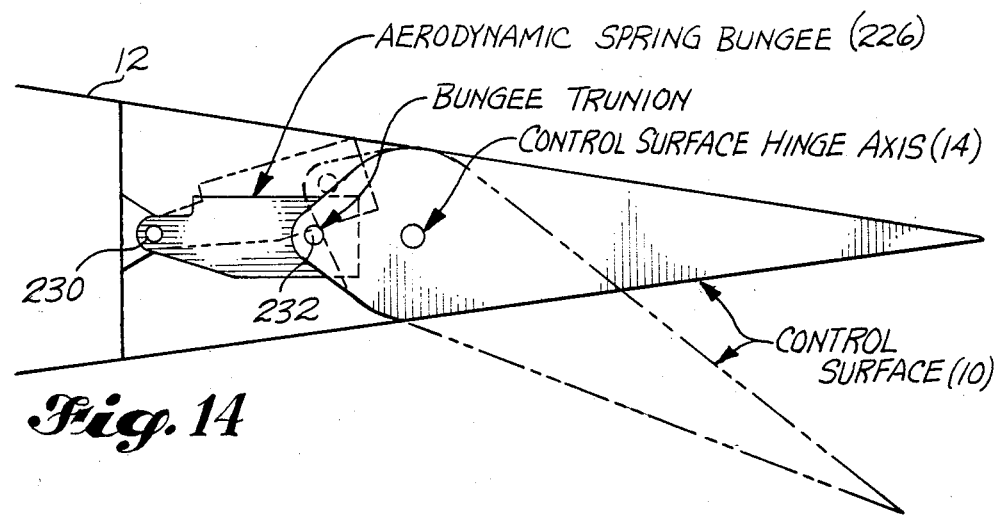
Fig. 14
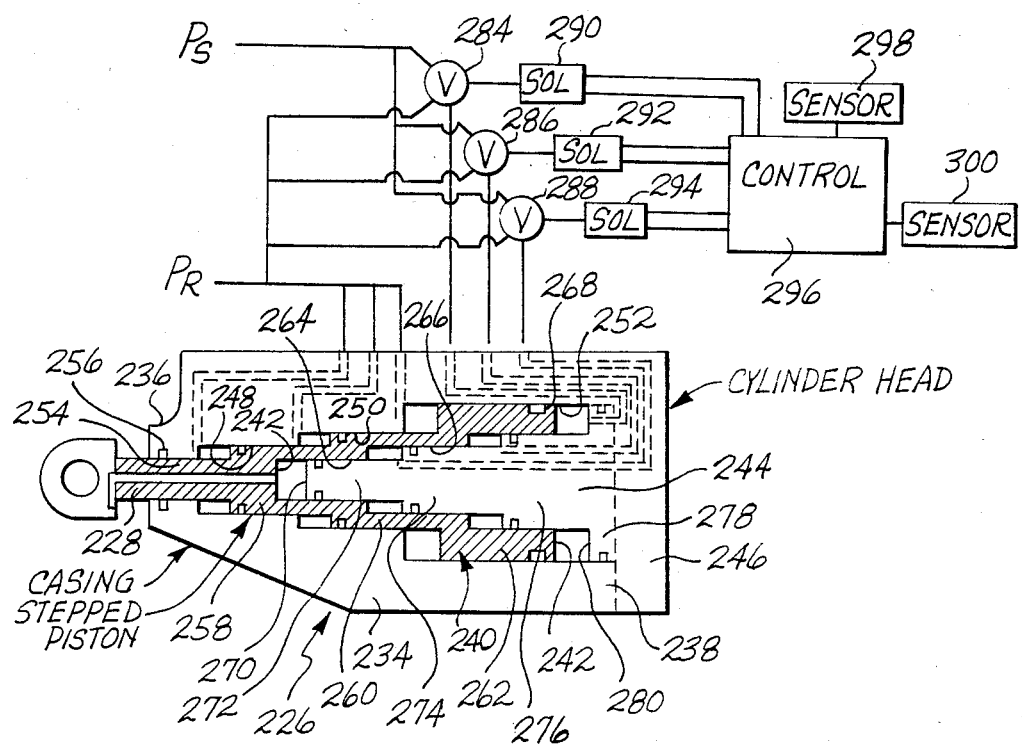
Fig. 15 AERO-SPRING BUNGEE SYSTEM WITH VARIABLE FORCE OUTPUT BUNGEE

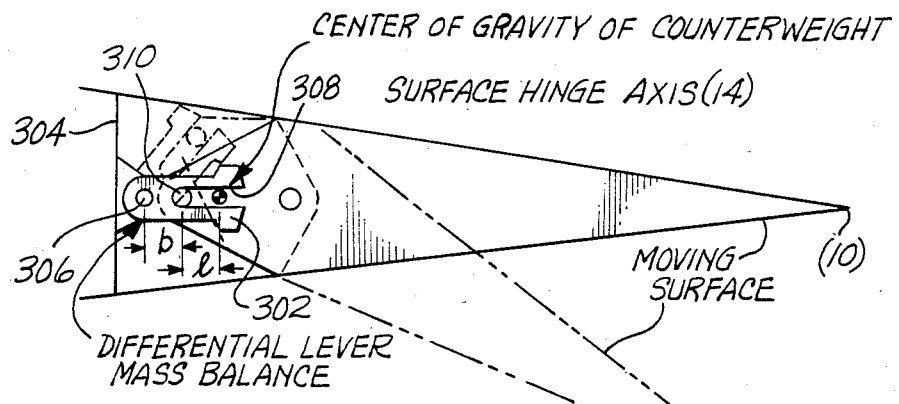
Fig. 16 DIFFERENTIAL-LEVER MASS COUNTERBALANCE
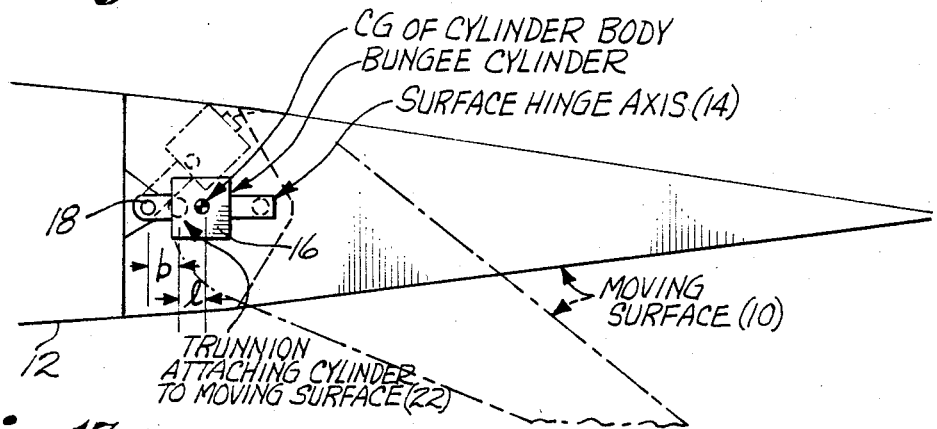
Fig. 17 AERO-SPRING COUNTERBALANCE BUNGEE MOUNTED AS A MASS COUNTERBALANCE
Fig. 18 OUTPUT GAIN CHANGER FOR A SERVOPOSITIONER
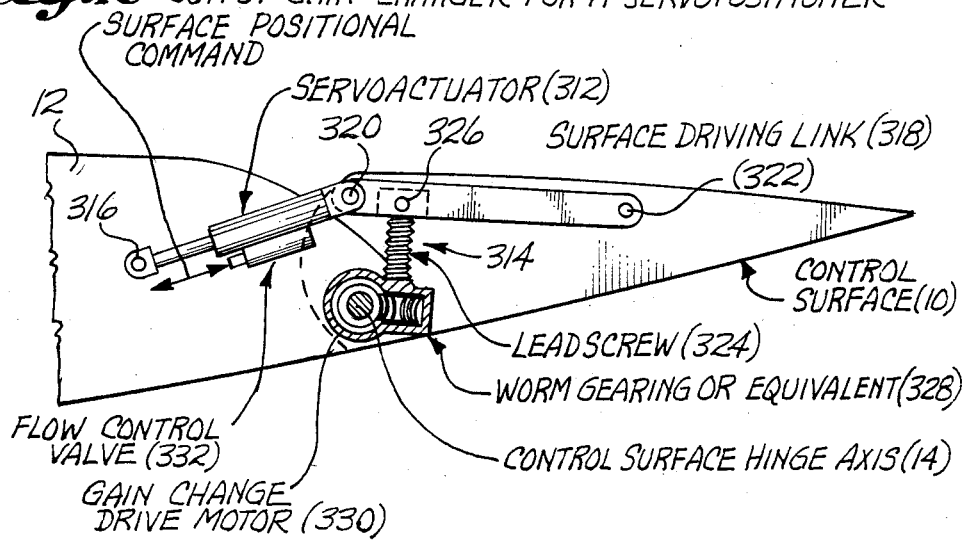

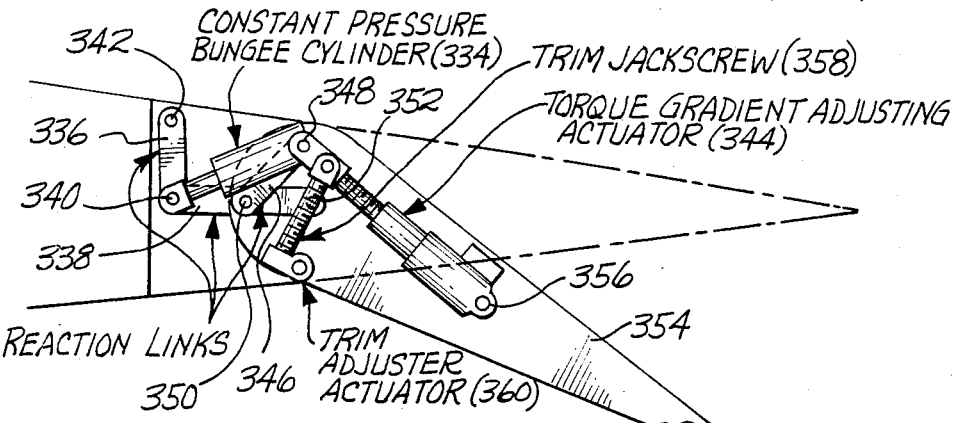
Fig. 19 BUNGEE WITH BOTH TRIM AND GRADENT ADJUSTMENTS
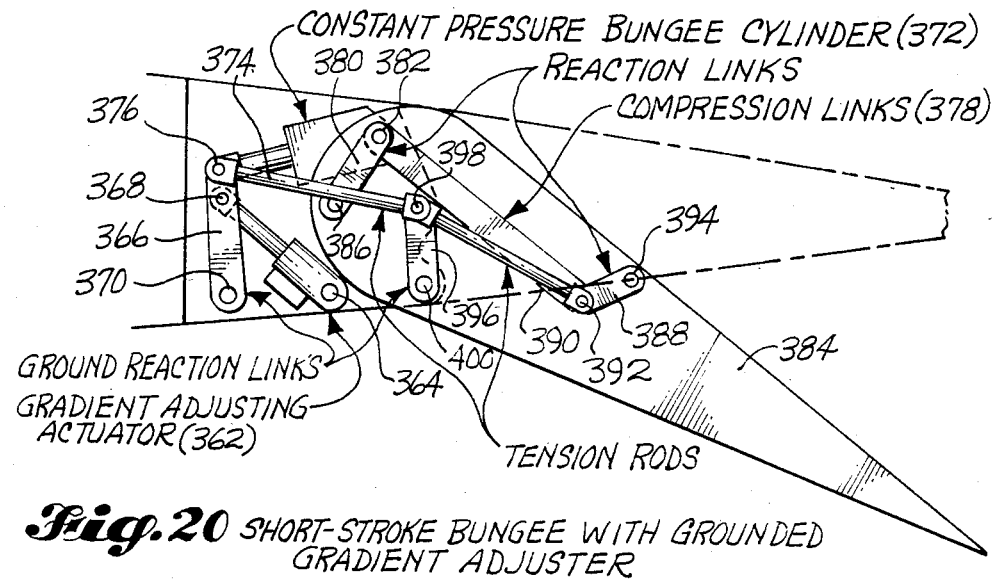
Fig. 20 SHORT-STROKE BUNGEE WITH GROUNDED GRADIENT ADJUSTER
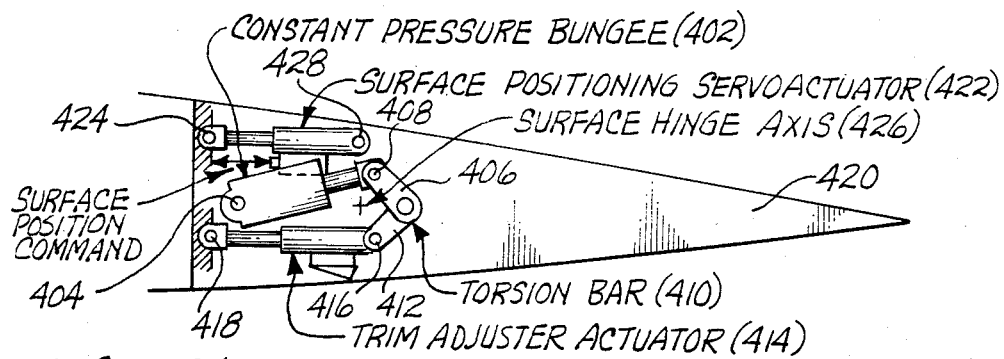
Fig. 21 TRIM TYPE SYSTEM COUPLED WITH A TORSION BAR SPRING

AIRCRAFT CONTROL SURFACE ACTUATION AND COUNTERBALANCING

This invention relates to aircraft control surfaces and in particular to actuation and counterbalance systems for a control surface, and to components of such systems.

Conventional hydraulic actuation systems with valved ram servoactuators operate very effectively in the positioning of their output loads and provide a high degree of response and good damping plus snubbing where required. Their output force-to-weight ratios are very high and they are not subject to jamming. However, for cyclic applications, such as for actuation of primary flight control surfaces where they work against an aerodynamic load to position the surface away from its neutral trimmed position, and with the aerodynamic load to return the surface to the neutral position, it can be considered that their overall power cycle efficiency is zero. Those aerodynamic surface high torque loads can be thought of as effective springs, yet the ram devices and valves, as currently used, are incapable of recovering any energy from these spring type loads when the control surface is moved in the direction of the aerodynamic load—(with the load aiding the motion). Hydraulic power supplied to the system by the pumps is all converted to heating the hydraulic fluid as it is throttled across the control valves to the return line.

In addition to the foregoing deficiency, the conventional fixed-displacement actuators, which are sized for the peak loads, demand considerably more power than is actually needed during maximum slew rate commands if those maximum slew rates only occur at lesser loads. That is the general case, and is typical of control surfaces which must be slewed at maximum rate only during low-speed conditions such as landing in gusty air and crosswinds when the loads are practically nil.

Due to the foregoing deficiencies, the pumps and distribution tubing for conventional hydraulic systems are generally larger than need be. Therefore, those deficiencies also serve to identify two possibilities for improvement. An actuator which could be made to adapt its output force or torque capability to the load at hand would reduce the maximum hydraulic flow and power demanded for that function. Secondly, an actuator which could be made to return work done by an overriding aerodynamic spring load to a storage reservoir (accumulator) would reduce the net flow and power drain from the system at any condition where an overriding spring load exists.

Two new actuation concepts to exploit these possibilities have been devised. These concepts are identified by the terms "load-adaptive" and "power-recoverable" where each term denotes the total servoactuator's behavior with respect to power or energy flow.

The use of load-adaptive and/or power-recovery type actuation systems could significantly reduce the waste of hydraulic power incurred with conventional actuation systems. This, in turn, could allow reductions in hydraulic system power and flow-rate capacity which would allow the use of smaller pumps, tubing sizes, reservoirs, and other components with a resultant saving of considerable weight.

The relative amount of power savings obtainable with load-adaptive actuation techniques applied to a typical flight control actuation system can be illustrated graphically with a plot of actuation system output torque (actuator force acting through a crank lever) and surface angular velocity requirements. Such a plot is shown in FIG. 1 where actuation system torque requirements are expressed in terms of surface hinge moment, and actuator rate requirements are expressed in terms of surface motion rates. Two typical design requirements, as follows, are shown thereon:

a. A high-q design requirement showing the relatively low rate required at maximum load, such as during high-speed flight.

b. A low-q design requirement showing the relatively high rate required at low load, such as during landing in gusty air.

The servoactuator must be sized to meet both requirements; and, the typical square-law curve of valve flow rate versus differential-pressure (force) output for a conventional ram actuator must encompass those design points and also have sufficient force margin to preserve some actuator dynamic response.

The power required for those design conditions is depicted by the two cross-hatched areas. However, the maximum power (and flow rate) demanded from the hydraulic supply system by a conventional actuator occurs during the maximum-rate demand and is depicted by the large area bounded by the X-Y axis and the outer coordinate lines. Although the hinge moment is low at the maximum-rate condition, the system must supply flow at a rate sufficient to fill the actuator displacement volume. Since only a low pressure differential is required to overcome the low hinge moment at that condition, the remainder of the available pressure differential is dissipated in the control valve and hydraulic lines.

A ram driving a flight control surface through a gain or ratio-changing linkage is a simple example of a load-adaptive actuator. Such a device is analogous to the combination of an engine and variable-ratio transmission in the drive train of a car. The engine torque, and thus work output, is adjusted by changing the gear ratio to meet varying demands of road gradient and vehicle acceleration.

An example of a reversible power system is more difficult to find in our everyday experience. An electric locomotive which returns power to the supply network on downgrades is such a system; however, the time frame of the energy exchange for a servo control system would be greatly compressed from this example. A rudimentary hydraulic actuating system of this type could be fabricated by gearing a variable-displacement hydraulic pump/motor to a load with the motor pressure supplied from a gas-charged accumulator. Motion of the load would be induced by changing or reversing the motor control cam thus shifting power from accumulator to load and back. Servos of this type have not been used extensively in industrial application and are unknown in aircraft usage. The conventional aircraft swash-plate motor does not adapt readily to such a use because of its high static frictions at the piston shoe to swash cam interface which would result in a large dead zone in the output function when the control yoke attempted to reverse the direction of output rotation. Variable-displacement hydraulic motors having very low reversing torque from swash-plate coupling friction are possible, but have not been built up to this time.

A second example of a power reversible servo-drive is the stroked-pump ram-output type integrated servo-actuator packages built by Dowty Boulton Paul Ltd. in England and used on the VC-10 airliner, Vulcan bomber, Belfast cargo transport and other aircraft. These units are truly power reversible in principle; however, they do not exploit this advantage adequately because of their rather large power demand under static load conditions. This high static demand is due to hydraulic windage in the rotating parts of their servo pumps which must spin at high speed in order to provide local storage of kinetic energy as rotor momentum. Efficient energy storage in such a unit would require at the least the use of dry sump hydraulic pumps and the application of a flywheel, with a partially evacuated case, coupled to the pump rotor assembly. The power drain of such machines under static output conditions is still expected to be high; therefore, their most advantageous use would be for applications where high servo activity is expected. However, this is not the typical load activity experienced by most aircraft flight servos.

The use of counterbalances to reduce the force required for actuating aircraft control surfaces is an old concept. Many light aircraft have control surfaces with some surface area located ahead of the hinge line to balance the normal aerodynamic load torque and thereby reduce pilot effort. However, this approach can only be applied to control surfaces located at the tip of a wing or stabilizer.

On early Boeing jet aircraft, internal balance panels located within the wing and stabilizer, were used to balance surface control loads. These balance panels consume valuable space and require that the rear spar of the parent surface, i.e.: the wing, horizontal stabilizer, or vertical fin, be located well ahead of the control surface hinge line, thus degrading the torsinal stiffness of each of those surfaces. On most later aircraft, the control surfaces are hydraulically actuated with no balance panels or manual reversion provisions. The hydraulic actuators are sized by the maximum load requirement, and normally operate well below their force capabilities thereby wasting much of the power drawn from the aircraft's secondary power system.

Since it appears that the use of fully-powered actuation systems will continue, it is believed that some form of counterbalancing to reduce actuation loads should again be considered if it could be incorporated in a design which did not increase aerodynamic drag or utilize excessive space. In doing so, it is recognized that the aerodynamic loads to be balanced will vary with the dynamic pressure and the center-of-pressure location in the control surface. Dynamic pressure is a function of air density and speed; and, as speed increases, the center of pressure moves aft thereby further increasing the hinge moment on a trailing edge surface.

It is also recognized that the aerodynamic load is a function of surface deflection. With the airplane trimmed out in straight and level flight, the aerodynamic load torque on a control surface generally varies along gradients, as shown in FIG. 2, and can be thought of as an aerodynamic spring (aero-spring) load since it acts to return the surface to its neutral position.

One way to make a hydraulic servoactuator both adaptable to load and reversible with respect to power flow, is to divide it into two specialized devices so as to provide two separate functions. A counterbalance device could be used in a passive mode to resist the steady-state component of the aerodynamic or gravity load; and, a small servoactuator of the conventional type could be used in an active mode to position the output.

The counterbalance device could be entirely separate from the hydraulic system, as in previous applications; or, a hydraulic unit could be used to provide the required force or torque in a relatively more compact package. In either case, the counterbalance device could be connected to the output with linkage which can be adjusted to compensate for changes of aerodynamic load during flight. If a hydraulic unit were used to supply the counterbalancing force or torque, it could be connected to the hydraulic system in a manner that would not draw a net flow of power. In other words, any power drawn from the system would be returned on a subsequent part of the actuation cycle.

With the counterbalancing device balancing the major portion of the load, the positioning actuator could be much smaller than normal since it would only be required to meet the inertial and velocity-related loads, such as system friction, and provide necessary damping. This would allow a significant reduction in its piston area, volumetric displacement, and flow demanded from the hydraulic system. Power recovery from the inertial portion of the load would also be possible with certain other servo designs, but would generally be unnecessary if the power involved is small.

Hydraulic piston units, similar to ordinary single-acting hydraulic actuating cylinders, acting through appropriate levers and linkage mechanisms could also be used to provide counterbalancing torques. Such units offer a means to balance the aerodynamic loads in a very compact package; and, since they can be arranged to provide a spring-like torque gradient to match the aero-spring loads, they are called hydraulic bungees.

Possible arrangements for such bungee cylinders fall into two general classes, here designated as aero-spring counterbalance bungees and trim counterbalance bungees. In both arrangements, the bungee cylinder would be connected to the hydraulic system pressure line without a control valve. This provides the desired power recovery feature in that, although the bungee cylinder would draw fluid from the hydraulic system when a control surface deflection is commanded, that fluid would be returned to the pressure line when the surface is returned toward its neutral position. Therefore, although work is exchanged between the surface aerodynamic load and the energy stored in the hydraulic system, there would be no net draw of hydraulic power from the hydraulic pumps. In some cases, an accumulator, or some other form of energy storage device, may be required to provide the system compliance necessary to absorb the returning fluid and return it to the bungee on the next cycle.

As previously stated, the flight control surface is deployed against an aerodynamic load which is a function of surface deflection and imposes a torque on the flight control surface wanting to rotate it back to a neutral trimmed position. In accordance with a basic aspect of the invention, a counterbalancing hydraulic actuator is connected between a frame portion of the wing and the flight control surface and is oriented to impose a counterbalancing torque on the flight control surface acting in opposition to the torque imposed by the aerodynamic load. A separate controlable actuator means is connected between the frame structure and the flight control surface and is used for positioning the flight control surface.

In accordance with an aspect of the invention, the counterbalancing actuator is adapted to produce a constant force and the torque arm of such actuator is adjusted to in that manner produce a variable counterbalancing torque.

In accordance with another aspect of the invention, a variable force hydraulic actuator is used to perform the counterbalancing function and the force of the actuator is adjusted in binary bits. An aspect of the invention is to provide a system utilizing such a variable force actuator, and to ways of mounting such actuator such that its torque arm length is a function of surface deflection.

An additional aspect of the invention is to provide a hydraulic bungee counterbalance system adapted so that any power drawn from the system for counterbalancing the flight control surface is returned to the system when the aerodynamic forces return the flight control surface to its neutral position.

Yet another aspect of the invention is to provide several arrangements of a counterbalance bungee cylinder, a surface positioning servo actuator, and a ratio-changing element innerconnected between the output of the surface positioning actuator and the flight control surface, adapted to act much like a variable-ratio transmission of a vehicle which adapts the torque output of the prime mover to the requirements of its load. These arrangements include the use of a torque gradient adjusting actuator and/or a trim adjuster actuator in combination with a constant pressure bungee cylinder, and to arrangements in which the counterbalancing-actuation mechanisms provide mass counterbalancing as well as hydrualic pressure counterbalancing.

A further aspect of the invention is to provide a differential-lever mass counterbalance for a flight control surface.

Other more detailed features of the invention are described in the description of the preferred embodiments and are particularly pointed out in the appended claims.

The present invention also comprises various combinations of the above described concepts and systems. Other aspects of the invention are included in the various illustrated embodiments.

Referring to the drawings,

FIG. 1 is a graph of surface rate verses hinge moment, illustrating the typical mechanical power requirements and hydraulic power demands for conventional flight control actuation systems;

FIG. 2 is a plot of aerodynamic load torque as a function of surface deflection and dynamic pressure;

FIG. 6 is a system view of a bungee cylinder of the type shown by FIGS. 3–5 and a known volumetric compensator;

FIG. 7 is a view like FIG. 6, but of a modified bungee cylinder and an improved volumetric compensator;

FIG. 8 is a concept view of a constant pressure bungee cylinder in combination with a torque gradient adjusting actuator;

FIG. 9 is a plot similar to FIG. 2, but including the counterbalance torque produced by a system of the type shown by FIG. 8;

FIG. 10 is a concept view of a constant pressure bungee cylinder in combination with a trim adjuster actuator;

FIG. 11 is a plot like FIG. 9, but showing the counterbalance torque produced by the system of FIG. 10;

FIG. 12 is a concept view of a constant pressure bungee cylinder in combination with a trim adjuster actuator and tension rods, arranged to provide a trim counterbalance system with fixed torque gradient;

FIG. 13 is a plot like FIGS. 9 and 11, but showing the counterbalance torque produced by the system of FIG. 12;

FIG. 14 is a concept view of a system which includes a variable force output bungee;

FIG. 15 is an enlarged scale view of the variable force output bungee and a schematic showing of a basic control system;

FIG. 16 is a concept view of a differential lever mass balance concept;

FIG. 17 is a concept view showing a bungee cylinder filling the function of the mass counterbalancing element;

FIG. 18 is a concept view of a surface positioning control actuator in combination with a gain changer;

FIG. 19 is a concept view of a bungee counterbalance actuator in combination with both trim and gradient adjustment actuators;

FIG. 20 is a view of a constant pressure bungee cylinder mounted for short-stroke action in combination with a grounded gradient adjusting actuator; and FIG. 21 is a concept view of a trim adjustment system coupled with a torsion-bar spring.

FIGS. 1 and 2 discussed above in the introduction.

Figure 3:
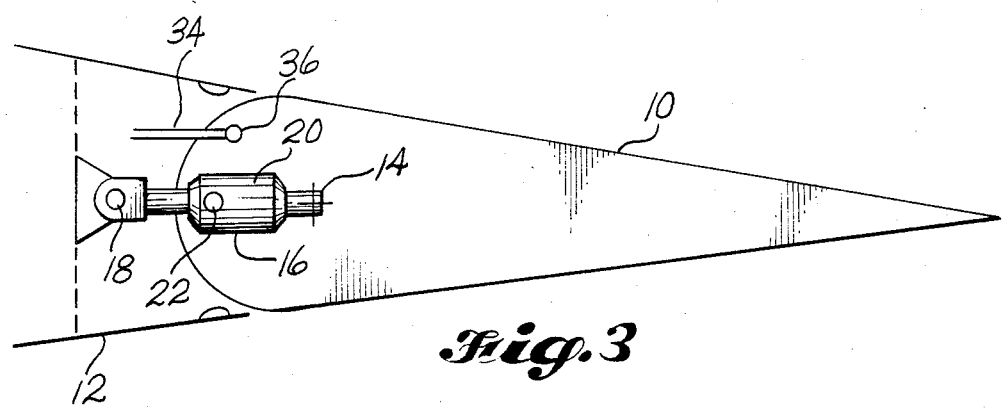
FIG. 3 is a concept view of the bungee counterbalance concept on which the invention is based.

FIG. 3 depicts the concept of dividing the function of the hydraulic servoactuator into two separate parts. In this concept view, the flight control surface 10 is shown to be hinge connected to a forward wing structure 12 for pivotal movement about a hinge axis 14. A first hydraulic servoactuator 16, herein termed a "bungee", is interconnected between the fixed wing structure 12 and the movable control surface 10. The rod end of the bungee 16 is pivotally attached at 18 to a grounded mounting structure. The bungee casing 20 is connected to the surface 10, such as by a pair of trunnions 22 and a trunnion engaging structure (not shown) connected to the surface 10 in which the trunnions 22 are received.

Figure 4:
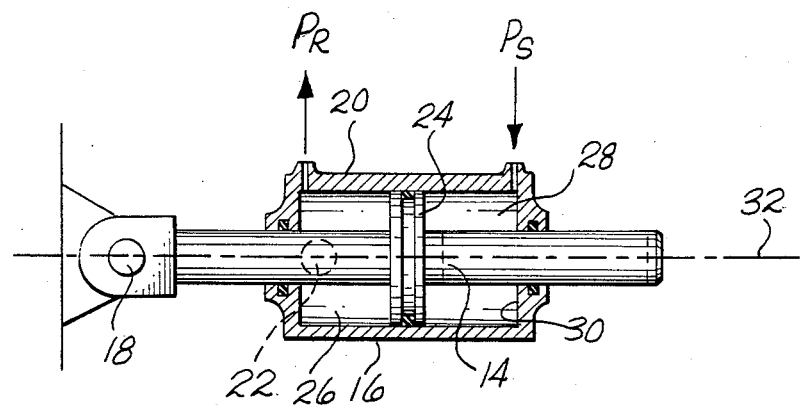
FIG. 4 is an enlarged scale view of a typical counterbalancing hydraulic actuator or "bungee", such view showing the grounded connection of the bungee, the trunnion connection of the bungee to the flight control surface and the surface hinge axis in alignment, resulting in a zero torque arm for the bungee.

As shown by FIGS. 3 and 4, when the flight control surface 10 is in its neutral or trim position, the pivot axes 18, 22, 14 are in alignment with the center line of the surface 10. A piston 24 within the casing 20 divides the interior of the casing into chambers 26 and 28. A higher pressure in chamber 28 would make the actuator 16 tend to elongate itself. In accordance with the invention, chamber 28 is always in communication with system pressure $P_s$ and chamber 26 is always in communication with return pressure $P_r$. As a result, there is always a higher pressure in chamber 28 exerting a force on the endwall 30 of casing 20. When the control surface is trim (FIG. 3), this force is directed along the center axis 32 of the surface 10 and has no rotational effect on the surface 10, i.e. there is no torque arm for the constant bungee force to act on to produce a rotational effect.

The system also includes a separate actuator for positioning the flight control surface 10. In FIG. 3 this actuator is schematically shown as a rod 34 adapted to apply a force on the control surface 10 at a location 36 which is always offset from the hinge axis 14. As a result, a push or a pull force exerted by actuator rod 34 will always exert a rotational torque on the surface 10.

Figure 5:
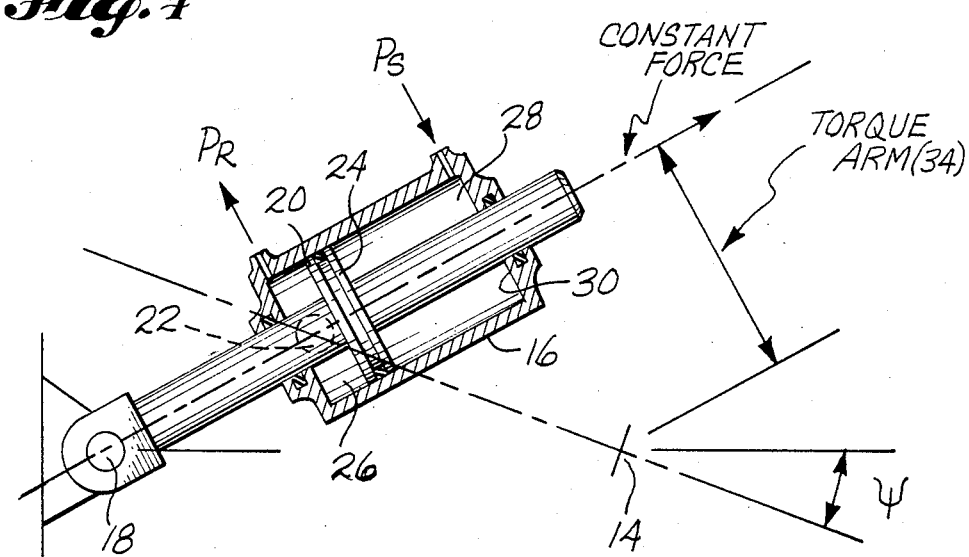
FIG. 5 is a view like FIG. 4, but showing the surface deflected and showing a torque for the bungee which is a function of surface deflection.

A comparison of FIGS. 4 and 5 show that as the surface 10 deflects, the pivot axis of trunnions 22 is moved out of alignment with pivot axis 18 and hinge axis 14 and a torque arm 34 is produced which is a function of surface deflection.

Bungee aided hydraulic control actuating systems will require that hydraulic flow be supplied by accumulators in order to support transient bungee motion without increasing transient flows in the pressure and return lines of the hydraulic distribution system.

A double acting piston type accumulator is required to exchange high and low pressure fluid with a bungee cylinder in order to prevent transient pumping of flows in aircraft distribution lines. The piston type accumulator would normally have a high pressure cylinder section and a gas reservoir, each stressed to contain fluid at the maximum system pressure.

Double acting volume compensated accumulators have been used before for remote storage of hydraulic/pneumatic energy. An accumulator of this type is built by Parker Hinnifin for use in the jet fuel starter system of the F-15 airplane. A unit of this type could be used to supply transient flows to a control surface bungee. However, this combination of accumulator and bungee would be unnecessarily heavy due to the large volume of liquid and containment vessels needed to support a given level of bungee force.

FIG. 6 shows a double acting accumulator or volumetric compensator 36 of a conventional type connected to hydraulic bungee 16. A superior volumetric compensator is shown by FIG. 7. It is adapted to provide a maximum bungee force level with a minimum displacement of hydraulic fluid. This result is accomplished by using approximately equal area gas and oil driven pistons in the bungee element. Dynamic seals between gas charge and return pressure areas are arranged with a pressurized section between two sealing elements. This ensures a near zero differential pressure between oil-to-gas sealing elements.

The weight advantage of the compensator shown by FIG. 7 can be seen in terms of a comparison of the liquid volumes of the two configurations. Compensators 36 and 38 are scaled to produce the same bungee force and stroke.

The comparative weights of bungees and accumulators of the types shown in FIGS. 6 and 7 is closely tied to the volume of oil which must be displaced by a unit of each type during one full stroke or cycle of the bungee element. The cross hatched areas in FIGS. 6 and 7 show the volume of hydraulic oil contained in each unit. This displaced oil volume, in the case of compensator 38, is about one-half that of the displaced oil volume in compensator 36. The resulting weight advantage of compensator 38 stems from the smaller diameter of the pressurized cylindrical shells of both bungee and accumulator which are necessary to produce equal bungee force output in either of the illustrated systems.

The compensators 36, 38 will now be described in greater detail.

Compensator 36 (FIG. 6) comprises a cylindrical housing 40 having opposite end walls 42, 44 and a center wall 46. Wall 46 includes a central opening 48 in which a piston rod 50 is slidably received. A seal 52 is provided for sealing between the wall of opening 48 and the rod 50. Piston heads 54, 56 are provided at the opposite ends of rod 50. Piston heads 54, 56 carry peripheral seals 58, 60 which seal between the piston heads 54, 56 and the inner wall of the casing 40.

A first variable volume chamber 62 is formed within housing 40 between piston head 54 and wall 42. This chamber 62 is vented to the atmosphere via a vent opening 64. An identical chamber 66 is defined at the opposite end of housing 40, between piston head 56 and end wall 44. This chamber 66 is in communication with a gas charge in a gas storage tank 68 via a connecting passageway 70. A third chamber 72 is defined between piston head 54 and center wall 46 and a fourth chamber 74 is defined between center wall 46 and piston head 56.

The bungee 16 has been previously described.

Chamber 74 of compensator 36 and chamber 28 of bungee 16 are connected to system supply pressure via conduits 76, 78. Chamber 72 of compensator 36 and chamber 26 of bungee 16 are connected to system return pressure via conduits 80, 82. Compensator chamber 60 and reservoir 68 contain fluid which is at the maximum system pressure.

Compensator 38 (FIG. 7) comprises a stepped housing 84 having a first diameter end section 86 and a larger diameter center section 88. A gas charge reservoir 90 is attached to section 88 and forms the second end of the compensator 38. The compensator 38 contains a piston 92 having a central portion 94 and a pair of oppositely projecting end portions 96, 98. Central portion 94 has a diameter matching the inside diameter of casing section 88.

Piston section 96 has a diameter corresponding to the inside diameter of casing section 86. Piston section 98 has an outside diameter equal to the diameter of piston section 96. Piston section 98 extends through a central opening formed in a wall 100 constituting the inner boundary of the gas charge reservoir 90. A first chamber 102 is defined between end wall 104 of casing 84 and end surface 106 of piston section 96. A second chamber 108 is defined between piston member 94 and a radial surface 110 formed where the casing 86 changes diameter. A third chamber 112 is formed between piston element 96 and wall 100.

In the system shown by FIG. 7, the bungee cylinder 16' comprises a piston 113 having equal diameter end portions 114, 116 and a larger diameter center portion 118. Piston portion 118 has an outside diameter matching the inside diameter of the larger diameter section 120 of a stepped casing. Piston end portion 116 has an outside diameter matching the inside diameter of the smaller casing section 122. A first chamber 124 is defined between piston member 118 and end wall 126 of the casing. A second chamber 128 is defined between piston member 118 and radial surface 130 formed where the casing changes diameter. A third chamber 130 is defined between end surface 132 of piston member 116 and end wall 134 of the casing. Compensator chamber 102 corresponds to bungee chamber 130 and they are connected by a conduit 136, a portion of which extends through the bungee piston. Compensator chamber 112 corresponds to bungee chamber 124 and they are connected together and to the system return pressure by conduits 138, 140. A portion of conduit 140 is formed in the piston body. Bungee chamber 128 is connected to the gas charge by a conduit 144. Compensator chamber 108 is vented to the atmosphere via a vent opening 146.

As should be apparent, the systems of FIGS. 6 and 7 operate in a power-recoverable mode. The stored gas charge energy is used for extending the bungee 16, 16'. The bungee force counterbalances the aerodynamic forces acting on a deployed flight control surface. The kinetic energy of the aerodynamic forces which rotate the flight control surface from a deployed position back to a neutral or trim position is converted to stored energy. Return movement of the flight control surface contracts the bungee 16, 16' and when this happens, high pressure fluid in chamber 28 of bungee 16 (chambers 128, 130 of bungee 16') is forced by the surface movement back into the compensator 36 or 38. In compensator 36, high pressure hydraulic fluid from bungee cylinder chamber 28 is transferred to compensator cylinder chamber 74. This causes a shift in position of the piston 50 in the direction of chamber 66. The gas in chamber 66 is compressed and energy storage is realized in the form of increased pressure in chamber 66, 68. This same thing happens in the system of FIG. 7, but in addition gas pressure is transferred from bungee cylinder chamber 128 back to the gas charge reservoir 90.

As previously stated, dynamic seals are provided between the gas charge and return pressure areas of the bungee 16' and the compensator 38 in the system shown by FIG. 7. Specifically, in compensator 38, a pair of seal elements 148 are carried by the portion of wall 100 which surrounds piston section 98. Seal elements 148 are axially spaced apart and an annular chamber 150 is provided between them. System supply pressure $P_S$ is communicated to chamber 150 via a conduit 152. In similar fashion, piston section 118 of bungee cylinder 60' is provided with a pair of axially spaced apart seal elements 154 and an annular fluid chamber 156 is located between seal elements 154. System supply pressure $P_S$ is communicated with chamber 156 via passage 158 leading from conduit 136. The presence of high pressure in the chambers 150, 154 insures a near zero differential pressure between the oil-to-gas sealing elements.

A pair of seal elements 158 are carried by piston section 96. These seal elements 158 are axially spaced apart and an annular chamber 160 is provided between them. Chamber 160 is connected to chamber 112 by a passageway 162.

The second end portion 98 of piston 92 is tubular in form. It includes a cylindrical sidewall and an inner surface 164 which together with the radial end surface 166 provide a pressure face towards the gas charge within the gas charge section 90 which is equal in area to the area of the piston end surface 106.

The central portion 94 of piston 92 carries a seal ring 168 which makes sealing engagement with the cylindrical inner surface of piston casing section 88. In similar fashion, the end portion 116 of the actuator piston carries a seal ring 170 which makes sealing engagement with a cylindrical inner surface of the cylinder section 122.

Actuator piston head 118 includes a side face 172 which forms one of the axial boundaries of chamber 116. Chamber 116 is connected to the gas charge via passageway 144. Hence, the pressure in chamber 116 is always tending to elongate the actuator. The gas pressure acting on surfaces 164, 166 loads the piston 92 against the body of fluid within chamber 102. This pressure is transmitted by the fluid through passageway 136 to the body of hydraulic fluid within chamber 130. Thus, a pressure exists within chamber 130 tending to elongate the actuator 113. The pressure within chambers 112 and 124 is at return pressure and for this reason is passive and does not tend to influence movement of either piston. When the volume of chamber 112 is decreasing, the volume of chamber 124 is increasing and fluid is being transferred from chamber 112 into chamber 124. When the volume of chamber 112 is decreasing, the volume of chamber 124 is increasing and fluid is transferred from chamber 124 into chamber 112.

In the same fashion as described above in connection with FIG. 1, the outer end portion of the actuator piston is pivotally attached at 174 to a first support (e.g. a fixed frame portion of a wing) and the cylinder body is pivotally attached by trunnions 176 to a second support (e.g. a movable control surface). When the apparatus shown by FIG. 7 is used in a counterbalancing system of the type previously described, and the pivot axis of elements 174, 176 are aligned with the pivot axis of the control surface, the actuator 113 does not influence angular movement of the control surface because of the alignment of the pivot axis. However, when the control surface is moved to place the axis of trunnions 124 out of alignment with its pivot axis and the axis of element 174, the pressures in chambers 128, 130 provide a constant force tending to elongate the actuator 16'. This force acts on a moment arm and produces a moment tending to counterbalance the aerodynamic forces acting on the control surface.

The apparatus shown by FIG. 7 provides a maximum force level with a minimum displacement of hydraulic fluid. This result is accomplished by the use of approximately equal area gas and oil driven pistons, e.g. surface 172 is approximately equal in area to surface 132.

The comparitive weight of the actuators and the accumulators of the type shown in FIGS. 6 and 7 is closely tied to the volume of oil which must be displaced by a unit of each type during full stroke or cycle of the actuator element. The cross hatched area in FIGS. 6 and 7 shows the volume of hydraulic oil contained in each unit. The displaced oil volume, in the case of FIG. 7, is seen to be about one-half that of the case illustrated in FIG. 6. The resulting weight advantage of the FIG. 7 configuration stems from the smaller diameter of the pressurized cylindrical shelves of both the actuator and the accumulator.

The flow compensating accumulator and bungee shown by FIG. 7 is the subject matter of my copending application Ser. No. 535,976, filed Sept. 26, 1983, and entitled "Flow Compensating Accumulator And Bungee".

Several bungee concepts will now be described.

Aero-spring counterbalance bungee concept (FIGS. 8 and 9): This type of bungee arrangement would generate a variable torque to balance the aerodynamic load torque of a control surface by using the pressurized bungee cylinder 16 mounted so that its moment or torque arm would increase with control surface deflection. An elementary example of this type is shown in FIG. 8. It includes a torque-gradient adjusting actuator 176 which also adjusts the bungee moment arm as the aerodynamic load changes with speed thereby minimizing the load on the surface positioning actuator (not shown in this view) throughout the flight.

The torque produced by the bungee reaction acting about the control surface hinge is approximately Torque $= Fr \sin \psi$ where:

F = Bungee reaction
r = Distance from bungee aft end to surface hinge axis
$\psi$ = Angle of incidence of control surface The radius r is adjusted by the torque-gradient adjusting actuator 176 to change the gain of torque with surface angle of incidence.

In the concept view, the piston rod is shown hinge connected at 178 to the lower end of a support link 180 and the inner end of a reaction link 182. The outer end of the reaction link 182 is pivotally connected to the movable control surface 10 for pivotal movement about an axis which coincides with the surface hinge axis 14. The upper end of support link 180 is pivotally attached at 184 to a fixed portion of the forward wing structure 12. A second reaction link 186 is pivotally attached at one end to the movable control surface 10, for pivotal movement about an axis 188 which is offset from the surface hinge axis 14. The opposite end of reaction link 186 is pivotally connected to the bungee casing and to one end of the torque gradient adjusting actuator 176, for pivotal movement about an axis 190. The second end of actuator 176 is pivotally connected to the movable control surface 10 for pivotal movement about an axis 192 which lies on the center line of the movable control surface 10.

As shown in FIG. 9, the balancing torques would oppose the load torques; and, the magnitude of the balancing torques would vary directly with surface deflection. The gradient of the balancing torques would be changed by the gradient adjusting actuator to match the changes of the aero-spring load torques with aircraft speed.

This adjustment need not ever be made at a high rate since the aero-spring load gradient changes slowly in response to aircraft speed and air density. This adjustment can best be made by tying the bungee adjustment function to a command from an air data system which responds to the dynamic pressure of the local airflow about the airplane. Some small margin of positive surface net spring rate must be allowed so that the bungee counterbalance system will not produce a divergent surface torque sufficient to override the surface positioning servo.

Trim counterbalance bungee concept (FIGS. 10 and 11): In an ideal trim type bungee system, a counterbalance torque is produced which is virtually independent of control surface angular position. Thus, although the direct aerodynamic torque is canceled out, the surface positioning servo must work against the effective spring rate of the surface aerodynamic forces. The trim bungee system requires a relatively fast follow-up action from its trim adjusting actuator. This sort of action is required to prevent stalling of the surface positioning servoactuator by the aerodynamic loads when large surface excursions are demanded. Trim bungee force or torque output should ordinarily be tied to a command generated by the force output or pressure differential appearing at the control surface positioning servo force requirement toward zero. The action of such a bungee would be analogous to that of an automatic trim system which adjusts a horizontal stabilizer angle of incidence to reduce the torque demand upon an elevator control surface.

In this type of arrangement, the moment arm of the bungee cylinder would be actively adjusted at a rate proportional to the load on the surface positioning servoactuator so that the load on the actuator would be continuously reduced toward zero. In this case, the bungee control acts as an integrating trim function in parallel with the output of the positioning actuator. An elementary example of this type of system is shown in FIG. 10 which illustrates a trim adjusting jackscrew actuator 194 which acts to trim out the load on the positioning actuator (not shown in this view).

Torque produced by this bungee cylinder is approximately Torque = Fl sin $\phi$ where:
F = Bungee reaction force
l = Distance from forward bungee attachment to surface hinge axis
$\phi$ = Angle between bungee axis and hinge reaction link The angle $\phi$ is essentially independent of surface angle of incidence.

As shown in FIG. 11, the direction of the balancing torque opposes the load, but does not vary with surface deflection.

Referring to FIG. 10, the piston rod of bungee 16 is pivotally connected to both the lower end of a support link 146 and the inner end of a reaction link 198, for pivotal movement on an axis 200. The outer end of reaction link 198 is pivotally attached to the control surface 10 on an axis that coincides with the surface hinge axis 14. The outer end of a second reaction link 202 is pivotally attached to the surface 10 for pivotal movement about an axis 204 lying on the center line of the surface 10. The inner end of reaction link 202 is pivotally attached to the bungee casing, for pivotal movement about axis 204. Link 202 is mounted such that swinging movement of link 202 will move the pivot axis 204 along an arc which passes through the surface hinge axis 14. A jackscrew type actuator 206 is innerconnected between a lower forward portion of the surface 10 and the reaction link 202.

A trim bungee system can also be devised which will generate an adjustable torque having a, more or less, fixed gradient. A system of this type is illustrated in FIG. 12.

This device uses the same type of torque adjustment as the basic trim bungee system shown by FIG. 10. However, an additional component of torque is added by the reaction of a tension link 208 about the control surface hinge. This torque component is approximately proportional to the surface angle of incidence. Surface position may be controlled by a small conventional type of hydraulic servoactuator, not shown in FIG. 12, or by a gain-adjustable surface positioning actuator of the type illustrated in FIG. 18. The trim adjusting actuator 210 in this scheme would be commanded in the manner of an automatic integrating trim function which would respond to a differential pressure signal from the surface positioning servoactuator. The inner end of tension link 208 is mounted on pivot axis 212. The outer end of tension rod 208 is pivotally connected to the outer end of a reaction link 214 and the lower end of a second reaction link 216, for pivotal movement about an axis 218. The upper end of reaction link 216 is pivotally connected to the movable surface 10 for pivotal movement about an axis 220.

The inner end of reaction link 214 is pivotally connected at 222 to the outer end of the bungee cylinder 16. Actuator 210 drives a jackscrew 224 which is connected to link 214.

Aero-spring bungee with gradient adjusted by varying the force output of the bungee element: FIGS. 14 and 15 illustrate an aero-spring gradient changing bungee system in which the spring gradient is adjusted by the selection of a net bungee system area by valving hydraulic pressure among a system of parallel hydraulic actuating cylinders where those cylinder areas are related as a binary sequence. The particular bungee scheme in FIG. 15 shows the proposed group of parallel mounted bungee cylinders arranged in a concentric assembly.

The bungee scheme shown in FIGS. 14 and 15 does not require a variable-geometry linkage coupling it to the flight control surface in order to produce an adjustable surface torque gradient. The force reaction of this bungee can be adjusted in a binary related step by valving a pressurized fluid into piston chambers having different working areas.

Trim bungee action can also be obtained by a system of parallel actuating cylinders similar to those illustrated in the binary bungee cylinder arrangement shown in FIG. 15. In this case, however, the bungee cylinders would drive the control surface through a normal bell crank in contrast to the toggle linkage shown in FIG. 15. Bungee cylinder areas would be adjusted by on-off valving of hydraulic pressure to the various parallel output areas of the bungee cylinder group. It would be necessary to generate the appropriate trim force or moment command from an air data system to avoid the limit-cycle action which would result from such discreet switching of bungee force, if this force were to be commanded by the servopositioner error or force output.

Referring now to FIG. 14, the control surface 10 and the bungee 226 are shown in two positions. When the control surface 10 is in its neutral or trim position, the force produced by the bungee 226 is directed through the control surface hinge axis 14, i.e. there is no torque arm. Hence, although bungee 226 is producing a force, such force is not producing a rotational effect on the control surface 10.

The rod 228 of actuator 226 is pivotally mounted to a fixed portion of the forward wing structure 12, for pivotal movement about an axis 230. The bungee casing is pivotally connected to the control surface 10 for pivotal movement about an axis 232 which is offset from the control hinge axis 14. Pivot location 232 is located between axes 230 and 14 and, as previously mentioned, when the control surface 10 is in its trim position it is in alignment with both the hinge axis 14 and the ground axis 230.

Referring to FIG. 15, the actuator 226 comprises an elongated casing 234 having a first end 236, a second end 238 and an inner casing cavity. The casing cavity has an access opening at the second end of the casing.

A movable piston 240 is located in the casing cavity. Piston 240 includes a rod end, including piston rod 228, and an opposite end including a radial end surface 242. Movable piston 240 is also formed to include an inner piston cavity having an inner end wall 242. Access into the cavity is provided from the second end of the piston 240. A fixed piston 244 projects into the piston cavity. Fixed piston 244 includes an outer head portion 246 by which it is attached to the casing 234.

The casing cavity has a plurality of cylinder section which progressively increase in diameter from the first end of the casing to the second end of the casing. The illustrated embodiment comprises three cylinder sections 248, 250, 252. An axial passageway 254 is formed at the first end of the casing 234. The piston rod 228 extends through this passageway and the casing includes an annular seal 256 which surrounds and seals against the piston rod 228.

A first radial chamber surface is formed where the passageway 254 and the cylinder section 248 meet.

A similar second radial chamber surface is formed where cylinder section 248 and cylinder section 250 meet. A third radial chamber surface is formed where cylinder section 250 meets cylinder section 252.

The movable piston 240 includes a plurality of piston sections corresponding in number to the cylinder sections. In the illustrated embodiment there are three movable piston sections and they are designated 258, 260 and 262. An outer radial piston surface is formed where the piston rod 228 connects to piston section 258. In similar fashion, an outer radial surface is formed where piston section 258 meets piston section 260. A third outer radial piston surface is formed where piston section 260 meets piston section 262.

The piston cavity and the fixed piston 244 are of a similar stepped construction. A radial chamber surface is formed where piston cavity section 264 meets piston cavity section 266. A similar radial chamber surface is formed where piston cavity section 266 meets piston cavity section 268. Fixed piston 244 includes an inner end surface 270. A radial piston surface is formed where first fixed piston section 272 meets second fixed piston section 274. A similar radial piston surface is formed where the second piston section 274 meets a third fixed piston section 276.

Fixed piston 244 includes an insert portion 278 immediately inwardly of the head 246 which snuggly fits within the large diameter cylinder section 252. A radial chamber surface 280 is formed at the inner end of 278.

As shown, the movable piston sections 258, 260, 262 carry seal rings which seal against the sidewall surfaces of cylinder sections 248, 250, 252. In similar fashion, the sections 272, 274, 276, 278 of fixed piston 244 carry seal rings which seal against the sidewall surfaces of piston cavity sections 264, 266, 268 and chamber section 252, as shown.

The chamber formed between surfaces 242 and 270 is non-functional and is vented to the atmosphere. This may be done via a vent passageway 282, formed in the piston rod end of movable piston 240. Alternatively, the vent passageway could be formed in the fixed piston 244.

Paired equal piston area chambers which drive the unit in and out are identified by circled numbers ①, ② and ③ on FIG. 15. In the preferred embodiment, the piston areas of chamber ①, ② and ③ are related in the radios of 1, 2 and 4.

The set of chambers ①, ② and ③ which are located on the piston rod end of the actuator 188 (on the left in FIG. 15) are bounded axially by the radial casing cavity surfaces and the outer radial surfaces on the movable piston 240. The corresponding chambers ①, ②, ③ at the opposite end of the actuator 226 are bounded axially by the radial surfaces of the piston cavity and the radial surfaces of the fixed piston 244.

The actuator 226 can be operated as either a unidirectional or a bidirectional binary force producer by the proper selection of the type of control valves used to control its chamber pressures. The illustrated embodiment requires three on-off three-way poppet or spool valves 284, 286, 288 to produce seven levels of force output of a single directional sign. In the illustrated embodiment, all three working actuator chambers ①, ②, ③ on the piston rod side of the piston 196 are either vented or supplied from a constant pressure source. Supply pressure is applied selectively, to one or more of the three opposing cylinder chamber ①, ②, ③, by operation of the three-way valves 284, 286, 288. Valves 284, 286, 288 may be positioned by solenoids 290, 292, 294, controlled by a suitable control device 296 which includes an input from an air speed sensor 298 and a control surface deflection sensor 300.

The actuator 226 could be used to produce seven steps of control force in either direction by the use of the system of three solenoid valves with each valve designed to produce the following output states.

| 1 Chambers (TYP.) | Right Chamber | Left Chamber |
|---|---|---|
| State 1 | 1 | 0 |
| State 2 | 0 | 1 |
| State 3 | 1 | 1 |
| Alternate State 3 | 0 | 0 |

The above valve output combinations could be produced by either six simple three-way poppet solenoid valves or by three double-poppet type solenoid valves. The design of the control system, including the control valves, is not considered a part of the present invention and for this reason the control system has only been schematically shown.

The design of the actuator 226 is not restricted to ±7 steps of force output level. The number of actuator working chambers can be increased or decreased by changing the number of steps of the working piston to adjust the binary bit count of the actuator to any number within reason.

As previously mentioned, an equivalent hydromechanical system could be devised using a group of parallel fluid actuators having piston areas related as a binary sequence. However, the concentric array of actuator sections incorporated in actuator 226 is seen to be superior to the equivalent parallel system of actuators in each of the following respects.

1. The concentric unit is very compact with minimum parts count.
2. External leakage paths are kept to an absolute minimum in the concentric actuator array.
3. The control valves may be simple solenoid driven poppets or ball valves.
4. The control valves may be grouped on the actuator body minimizing plumbing complexity.
5. The output vectors of all actuator segments are co-linear.

The actuator 226 forms the subject matter of my copending application Ser. No. 535,980, filed Sept. 26, 1983, and entitled, Fluid Actuator For Binary Selection of Output Force.

Another meaning of the term "counterbalance", inferring mass counterbalance, is often used with respect to aircraft control surfaces. Such a mass counterbalance is normally encountered in the form of a system of counterweights applied ahead of the surface hinge. With some arrangements, an aero-spring type counterbalance bungee could also be made to serve as a mass counterbalance as well, with this combination of functions resulting in a further net weight saving to the aircraft.

Some degree of control surface mass balancing may be required in a bungee counterbalance system, because of the small contribution to overall output stiffness which would be provided by the very small positioning servoactuators which are allowed by such systems.

FIG. 16 is a concept view of a method of reducing the direct weight penalty of control surface mass counterbalances by the use of a differential-lever system. The mechanism shown in FIG. 16 comprises a mass 302 which is pivotally connected to a fixed support 304 for pivotal movement about an axis 306. The mass 302 includes a longitudinal slot 308 in which a load transferring element (e.g. a pin 310) is received. The location of the pin 310 on the control surface is such that when the control surface 10 is in its trim or neutral position the pivot point axis 306, the axis of pin 310, the center line of the slot 308 and the surface hinge axis 14 are all in alignment upon the center line of the surface 10.

FIG. 17 illustrates the application of the same differential-lever principle to an aero-spring counterbalance bungee which serves in a dual function as a surface mass-balance counterweight.

The effectiveness of a differential-lever counterbalance can be measured against that of a simple mass counterbalance attached to the moving surface at a distance r ahead of the surface hinge axis. The differential-lever scheme illustrated in FIGS. 16 and 17 increases the effective first moment of the counterweight mass by a factor of approximately $(1/b+L)$ where L and b are as illustrated in FIGS. 16 and 17.

Surface positioning actuator: The second major element of a bungee counterbalanced actuation system is the surface positioning actuator. This servo element may also be devised to operate in a power-recoverable mode so that energy is exchanged between the internal storage of the system and the kinetic energy of the moving surface.

However, a mode of operation which is purely dissipative would usually be adequate if the device is kept reasonably small. The use of counterbalancing allows this servoactuator to be much smaller than the conventional surface positioning servoactuator since it has only to cope with dynamic loads. Such dynamic or periodic loads will require periodic servo output amplitude which is generally an inverse function of surface aerodynamic gain (effectiveness) as related to dynamic pressure (q). The major design requirements of such a servoactuator element would be for adequate dynamic stiffness and for forward bandpass.

Incorporation of a gain changer for the output of a surface positioning servoactuator: A ratio-changing element placed between the output of a surface positioning actuator and its loaded surface will act much like the variable-ratio transmission of a vehicle which adapts the torque output of the primeover to the requirements of its load. This form of adaption allows a smaller actuator to handle a wider range of loads without stalling or loss of positional resolution.

Referring to FIG. 18, a control surface position servo 312 is coupled to the control surface 10 through a ratio-changing mechanism 314. The forward end of the servoactuator 312 is pivotally attached to the forward wing structure for pivotal movement about a pivot axis 316. The opposite end of the servoactuator 312 is pivotally attached to the forward end of a surface driving link 318, for pivotal movement about an axis 320. The rear end of surface driving link 318 is pivotally attached to the control surface 10 for pivotal movement about an axis 322. A lead screw 324 is connected to the link 318 at a location 326 closely adjacent the forward end of link 318. Lead screw 324 is driven by a worm gearing or equivalent drive mechanism 328, shown to be driven by a gain change drive motor 330 having an axis of rotation coincident with the control surface hinge axis 14. The servoactuator 312 is provided with the usual flow control valve 332.

The illustrated device of FIG. 18 will eliminate the need for a torque, or force, limiting of control surface servos by substituting a continuously variable surface position limit for the conventionally used force/torque limiter scheme.

The above discussed figures of the drawing, and in particular the diagram shown by FIGS. 3-8, 10, 12 and 14-8, are conceptual in nature and are to simply illustrate basic principles. Single links, etc. have been illustrated. In actual embodiments, some of the links may be in the form of two members, one on each side of a third link or member, or yoke type structures might be used. Also, the various principles that have been separately illustrated and described may be combined together in many different ways, and this combination will dictate the final detail design and arrangement of the components of the system.

In order to facilitate the search for desirable combinations of these basic mechanisms, a list of desirable features which may be considered to be design objectives for any bungee counterbalanced actuation system has been compiled.

OBJECTIVES AND DESIRABLE CHARACTERISTICS

1. The bungee gradient and surface positioner gain adjustments should be combined so as to be driven by one gain-setting actuator unit.
2. The servopositioner gain, torque trim, and torque gradient adjusting actuators should be mounted or grounded on fixed structure as opposed to mounting on the moving body of the control surface.
3. The stroke of any bungee elements should be reduced to a practical minimum to save actuation system weight.
4. A maximum torque or gradient range should be available from any bungee mechanism, with that range adjustable to a near zero magnitude or slope.
5. If trim adjustment is provided together with a gradient-adjusting system, only enough trim range should be provided to cancel out the first-order errors of the gradient-adjustment scheme.
6. Maximum use should be made of the mass moment of a bungee counterbalance device and its related linkage in order to balance the control surface mass moment about its hinge.
7. The bungee mechanization should allow the control surface hinge to be located close to the rear spar of the fixed surface in order to conserve structural weight.
8. Combinations of surface actuators and bungees must lend themselves to duplication in parallel redundant sets or groups without excessive duplication of mechanical linkage or compromise of control surface structural integrity.

The following FIGS. 19-21 illustrate combinations of the basic devices and principles already described. Some of these first combined systems are shown, not as proposed examples of applicable schemes, but rather to illustrate further principles for possible later use.

FIG. 19 illustrates a single mechanism combining the aero-spring and trim counterbalance bungee functions.

Referring to FIG. 19, the bungee cylinder 334 is pivotally attached at its forward end to both the lower end of a reaction link 336 and the forward end of a second reaction link 338, for pivotal movement about an axis 340. The upper end of reaction link 336 is pivotally connected to a grounded member for pivotal movement about an axis 342. The opposite end of bungee cylinder 334 is pivotally attached to both the forward end of a torque gradient adjusting actuator 344 and the upper end of a reaction link 346. The lower end of reaction link 346 is pivotally connected to a mid span portion of link 338 for pivotal movement about an axis 350.

The after end of reaction link 338 is pivotally attached for movement about a pivot axis 352 coinciding with the hinge axis of surface 354. The after end of actuator 344 is pivotally attached to a center line portion of surface 354, for pivotal movement about an axis 356. The upper end of a trim jack screw 358 is connected to a forward end portion of the actuator 344. The lower end of the trim jack screw 358 is driven by a trim adjuster actuator 360 carried by the moving surface 354.

With a combination of bungee functions as shown by FIG. 19, one bungee torque adjusting system, either trim or gradient, should dominate the other since the two adjuster devices will otherwise provide unnecessary duplication of their basic function.

FIG. 20 shows the modification of the elementary gradient-adjusting bungee system, described above in conjunction with FIG. 8. This system is an example of an arrangement which meets objectives 2, 3, 4, and 7 as listed above. Although this system is rather complex, it has the following desirable features not available in the elementary arrangement. The bungee gradient-adjusting actuator is grounded to the fixed surface structure. This system also removes major bungee loads from the gradient-adjuster screw jack, reduces bungee stroke, and removes major bungee load from the moving surface structure.

In the embodiment shown by FIG. 20, a gradient adjusting actuator 362 is pivotally mounted at one end to a grounded structure, for pivotal movement about an axis 364. The opposite end of the gradient adjusting actuator 362 is pivotally connected to an intermediate point on a reaction link 366, for pivotal movement about an axis 368. The lower end of reaction link 366 is connected to a grounded structure, for pivotal movement about an axis 370. The upper end of reaction link 366 is pivotally connected to both the forward end of a constant pressure bungee cylinder 372 and the forward end of a tension rod 374, for pivotal movement about an axis 376. The rear end of bungee cylinder 372 is pivotally connected to both the forward end of a compression link 378 and the upper end of a reaction link 380, for pivotal movement about an axis 382. The lower end of reaction link 380 is pivotally attached to the aircraft surface 384, for pivotal movement about an axis 386. The rear end of compression link 378 is pivotally attached to both the forward end of a reaction link 388 and the rear end of a tension link 390, for pivotal movement about an axis 392. The after end of reaction link 388 is pivotally attached to surface 384, for pivotal movement about an axis 392. The after end of tension rod 374 and the forward end of tension rod 390 are pivotally connected together and to the upper end of a grounded reaction link 396, for pivotal movement about an axis 398 coinciding with the hinge axis of the surface 384. The lower end of grounded reaction link 296 is connected to a grounded structure for pivotal movement about an axis 400.

The above described system does not make very effective use of the bungee mass counterbalance of the moving surface mass. Also, the rear spar location of the fixed surface structure is somewhat farther from the surface hinge than is desirable. Either a small-area conventional positional servoactuator, or a gain-changing servoactuator of the type illustrated in FIG. 18 can be used with the bungee system shown by FIG. 20. The tension rods 374, 390 and the grounded reaction links 366, 396 of this configuration enable the gradient adjuster to move both ends of the bungee cylinder in a fore and aft direction as the bungee torgue gradient is adjusted. This greatly reduces the bungee stroke length required by a system such as the one illustrated in FIG. 8.

Torque-bar-coupled trim type bungee system: torque-trimming bungee systems such as those illustrated in FIGS. 10 and 12 tend to be more specialized than the torque-gradient bungee systems. Positioned servogain-changer functions cannot be integrated with trim actuator functions. Also, the geometry of a trim bungee linkage tends to make the bungee mass less effective as a surface counterweight than is the case with the gradient-control systems illustrated. In order to allow the mounting of a trim adjuster on the non-moving wing or stabilizer structure, it is necessary to couple the trim bungee-adjuster to the moving control surface through a torsion-bar element. A system of this type is shown in FIG. 21.

Referring to FIG. 21, the constant pressure bungee 402 is pivotally attached at its forward end to a grounded structure, for pivotal movement about an axis 404. The opposite end of bungee 402 is pivotally attached to the free end of a lever 406, for pivotal movement about an axis 408. The opposite end of lever 406 is firmly attached to a torsion bar 410. A second lever 412, spaced axially along torsion bar 410 from lever 406, is firmly connected at one end to the torsion bar 410. The opposite or free end is pivotally attached to the after end of a trim adjuster actuator 414, for pivotal movement about an axis 416. The forward end of trim adjuster actuator 414 is pivotally attached to a grounded structure, for pivotal movement about an axis 418. The surface member 420 is positioned by a surface positioning servoactuator 422. The forward end of servoactuator 422 is pivotally attached to a grounded structure for pivotal movement about an axis 424. The after end of servoactuator 422 is pivotally attached to a location on the surface 420, offset radially outwardly from the surface hinge axis 426, for pivotal movement about an axis 428 that is offset radially outwardly from the surface hinge axis 426.

As in other trim bungee systems, the trim adjuster of FIG. 21 responds to a signal derived from the force or differential-pressure output of the surface positioning servoactuator so as to null out the load on that cylinder. The bungee element serves only to unload the trim-adjuster drive. The surface positioning servoactuator must drive against both the spring rate or gradient of the aerodynamic surface load and against the spring rate of the torsion-bar element of this bungee coupling scheme.

A second version of this scheme would eliminate the bungee element. The combined action of the trim-adjuster actuator and the torsion bar within provide the required surface trim torque.

The subject invention comprises the above counterbalancing concepts, both separately and in various combinations with each other, as defined by the appended claims.

What is claimed is:
1. In an aircraft,
a frame structure;
a flight control surface supported from the frame structure, for pivotal movement about a hinge axis, said surface being deployed against an aerodynamic load which is a function of surface deflection and imposes a torque on the flight control surface wanting to rotate it back to a neutral trimmed position;
a source of hydraulic pressure;
a counterbalancing hydraulic actuator, in the form of a single acting hydraulic cylinder which is connected to the source of hydraulic pressure by a valveless conduit means, said cylinder being connected between the frame structure and the flight control surface, and being oriented to impose a counterbalancing torque on the flight control surface acting in opposition to the torque imposed by the aerodynamic load; and
controllable separate positioning actuator means connected between the frame structure and the flight control surface for positioning the flight control surface.

2. A system according to claim 1, comprising means including the counterbalancing hydraulic actuator for producing a controllable variable counterbalancing torque.

3. A system according to claim 1, comprising means mounting the counterbalancing actuator such that it has a moment arm measured from the hinge axis which increases with control surface deflection.

4. A system according to claim 3, wherein the means mounting the counterbalancing actuator positions the actuator such that when the flight control surface is in its neutral position the force produced by the counterbalancing actuator passes through the hinge axis and upon rotation of the flight control surface away from its neutral position the force has a torque arm measured from said hinge axis which is a function of surface deflection.

5. A system according to claim 4 wherein the mounting means for the counterbalancing actuator includes first means mounting a forward first end of the counterbalancing actuator in a fixed position relative to the frame structure for pivotal movement about a forward axis which is parallel to and spaced forwardly from the pivot axis for the flight control surface, and second means connecting the rearward second end of the counterbalancing actuator to the flight control surface, for pivotal movement about a rearward axis which when the flight control surface is in its neutral position is located between and in line with said forward axis and said hinge axis.

6. A system according to claim 1, wherein the means mounting the counterbalancing actuator includes means for adjusting the torque arm of such actuator as the aerodynamic load changes with speed.

7. A system according to claim 2, wherein the means for producing a control variable counterbalancing torque includes means for adjusting the gradient of the counterbalancing torque to match changes of the load torque gradient with aircraft speed.

8. A system according to claim 2, wherein the means for producing a controllable variable counterbalancing torque includes means for adjusting the torque arm of the counterbalancing cylinder at a rate substantially proportional to the load on the positioning actuator means.

9. A system according to claim 1, further including an arrangement in which at least the counterbalancing hydraulic actuator also functions as a mass counterbalance for the flight control surface.

10. A system according to claim 1 including a ratio-changing means positioned between the positioning actuator means and the flight control surface, operable to adapt the torque output of the actuator means to the requirements of the loads on the flight control surface.

11. A system according to claim 1, wherein the counterbalancing actuator is a variable force actuator.

12. A system according to claim 11, wherein the counterbalancing hydraulic actuator is adapted to provide a plurality of force output binary bits.

13. A system according to claim 11, comprising means mounting the counterbalancing actuator such that it has a moment arm measured from the hinge axis which increases with control surface deflection.

14. A system according to claim 13, where the means mounting the counterbalancing actuator positions the actuator such that when the flight control surface is in its neutral position the force produced by the counterbalancing actuator passes through the hinge axis and upon rotation of the flight control surface away from its neutral position the force has a torque arm measured from said hinge axis which is a function of surface deflection.

15. A system according to claim 1, comprising a torsion bar carried by the flight control surface, having an axis which is parallel to the hinge axis of the flight control surface, a lever connected to the torsion bar and extending radially outwardly therefrom, said lever having a free end portion, means pivotally attaching an end of the counterbalancing hydraulic actuator to the free end of said lever, and means for rotatably adjusting the torsion bar in position to in that manner change both the angular position of the lever and the counterbalancing hydraulic actuator.

16. A system according to claim 15, wherein said torsion bar includes a second lever extending radially outwardly therefrom, said second lever also having a free end portion, and a trim adjuster actuator interconnected between the free end of the second lever and the aircraft frame structure, and arranged so that lengthening and shortening of the trim adjuster actuator will swing the second lever in position, causing a rotation of the torsion bar and the first lever connected thereto.

17. In an aircraft,
a frame structure;
a flight control surface supported from the frame structure, for pivotal movement about a hinge axis, said surface being deployed against an aerodynamic load which is a function of surface deflection and imposes a torque on the flight control surface wanting to rotate it back to a neutral trimmed position;
a counterbalancing hydraulic actuator connected between the frame structure and the flight control surface, and oriented to impose a counterbalancing torque on the flight control surface acting in opposition to the torque imposed by the aerodynamic load;
controllable separate positioning actuator means connected between the frame structure and the flight control for positioning the flight control surface; and
a source of fluid pressure connected to said hydraulic actuator by an open conduit arranged to both deliver energy to and receive it back from the counterbalancing hydraulic actuator.

18. A system according to claim 17, including a fluid energy storage accumulator.

* * * * *

UNITED STATES PATENT AND TRADEMARK OFFICE
CERTIFICATE OF CORRECTION

PATENT NO. : 4,595,158

DATED : June 17, 1986

INVENTOR(S) : Curtiss W. Robinson

It is certified that error appears in the above-identified patent and that said Letters Patent are hereby corrected as shown below:

On the front page, left column, "[73] Assignee: The Boeing Company, Wichita, Kans." should be deleted.

Column 3, line 1, "Belfast" should be -- Belfact --.

Column 3, lines 47-48, "in the control surface" should be deleted.

Column 4, line 60, "controlable" should be -- controllable --.

Column 6, line 33, -- are -- should be inserted before "discussed".

Column 10, line 29, "comparitive" should be -- comparative --.

Column 13, line 22, "discreet" should be -- discrete --.

Column 13, line 56, "section" should be -- sections --.

Column 14, line 45, "radios" should be -- ratios --.

UNITED STATES PATENT AND TRADEMARK OFFICE
CERTIFICATE OF CORRECTION

PATENT NO. : 4,595,158

DATED : June 17, 1986

INVENTOR(S) : Curtiss W. Robinson

It is certified that error appears in the above-identified patent and that said Letters Patent are hereby corrected as shown below:

Column 14, line 65, "chamber" should be -- chambers --.

Column 15, first line of text after line 6, "1" should be -- ① --.

Column 15, lines 48-49, "Fluid Actuator for Binary Selection of Output Force" should be within quotation marks.

Column 16, line 20, "1/b - L" should be -- 1/b + L --.

Column 17, lines 7-8, "Figs. 3-8, 10, 12 and 14-8" should be -- Figs. 3-5, 8, 10, 12, and 14-18 -- .

Column 19, line 7, "torgue" should be -- torque --.

Claim 17, Column 22, line 29, -- surface -- should be inserted after "control".

This certificate supersedes Certificate of Correction issued January 13, 1987.

Signed and Sealed this

Twenty-eighth Day of April, 1987

*Attest:*

DONALD J. QUIGG

*Attesting Officer*  *Commissioner of Patents and Trademarks*